(12) United States Patent
Forster et al.

(10) Patent No.: US 7,366,466 B2
(45) Date of Patent: Apr. 29, 2008

(54) WIRELESS COMMUNICATION DEVICE INTERCONNECTIVITY

(75) Inventors: Ian J. Forster, Essex (GB); Peter Robert George Horrell, Essex (GB)

(73) Assignee: Mineral Lassen LLC, Las Vegas, NV (US)

( * ) Notice: Subject to any disclaimer, the term of this patent is extended or adjusted under 35 U.S.C. 154(b) by 231 days.

(21) Appl. No.: 10/301,483

(22) Filed: Nov. 21, 2002

(65) Prior Publication Data

US 2003/0181229 A1 Sep. 25, 2003

Related U.S. Application Data

(60) Provisional application No. 60/331,963, filed on Nov. 21, 2001.

(51) Int. Cl.
*H04B 7/00* (2006.01)

(52) U.S. Cl. ............... 455/41.2; 455/41.1; 455/67.14; 455/423; 455/82; 455/115.1; 455/550.1; 340/10.1; 235/492

(58) Field of Classification Search ............... 713/200; 455/41.1–41.2, 82, 67.14, 423, 115.1; 340/10.1–10.6; 235/492

See application file for complete search history.

(56) References Cited

U.S. PATENT DOCUMENTS

| | | | | |
|---|---|---|---|---|
| 4,075,632 A | * | 2/1978 | Baldwin et al. | ............... 342/51 |
| 5,245,346 A | * | 9/1993 | Nishimura et al. | ........... 342/42 |
| 5,355,513 A | * | 10/1994 | Clarke et al. | .................. 455/20 |
| 5,425,076 A | * | 6/1995 | Knippelmier | ............ 379/27.04 |
| 5,444,448 A | * | 8/1995 | Schuermann et al. | ......... 342/42 |
| 5,517,194 A | * | 5/1996 | Carroll et al. | ........... 340/10.34 |
| 5,541,604 A | * | 7/1996 | Meier | ......................... 342/42 |
| 5,634,203 A | | 5/1997 | Ghaem | |
| 5,710,984 A | * | 1/1998 | Millar et al. | ................... 455/80 |
| 5,748,084 A | * | 5/1998 | Isikoff | ...................... 340/568.1 |
| 5,852,421 A | * | 12/1998 | Maldonado | ................. 343/702 |
| 5,942,977 A | * | 8/1999 | Palmer et al. | ........... 340/572.5 |
| 6,021,319 A | * | 2/2000 | Tigwell | .................... 455/151.2 |
| 6,236,363 B1 | * | 5/2001 | Robbins et al. | ............. 342/360 |
| 6,320,545 B1 | | 11/2001 | Nagumo | |
| 6,378,774 B1 | * | 4/2002 | Emori et al. | ................ 235/492 |

(Continued)

FOREIGN PATENT DOCUMENTS

EP 0 416 792 A 3/1991

(Continued)

*Primary Examiner*—William Trost
*Assistant Examiner*—Ariel Balaoing
(74) *Attorney, Agent, or Firm*—Christensen O'Connor Johnson Kindness PLLC

(57) ABSTRACT

A wireless communication device that is attached or included in an electronic object, such as a portable computer, having its own separate communication system. The separate communication system has an antenna for receiving and transmitting wireless communications, and is powered by a power supply included in the object. Since the separate communication system can only communicate when powered, a separate passive wireless communication device is provided for wireless communication that does not require power from the power supply to communicate. The wireless communication device is interfaced with the existing antenna of the separate communication system so that the wireless communication device and separate communication system share a common antenna to reduce cost. The antenna may also be interconnected to a controller associated with the object so that the controller can directly communicate to the wireless communication device.

31 Claims, 10 Drawing Sheets

U.S. PATENT DOCUMENTS

| | | | |
|---|---|---|---|
| 6,456,228 B1* | 9/2002 | Granhed et al. | 342/51 |
| 6,492,846 B1* | 12/2002 | Taguchi et al. | 327/112 |
| 6,542,750 B2* | 4/2003 | Hendrey et al. | 455/456.1 |
| 6,643,522 B1* | 11/2003 | Young | 455/552.1 |
| 6,946,950 B1* | 9/2005 | Ueno et al. | 340/10.1 |
| 6,961,368 B2* | 11/2005 | Dent et al. | 375/219 |
| 2001/0001758 A1* | 5/2001 | Greeff et al. | 455/41 |
| 2001/0041591 A1* | 11/2001 | Carroll | 455/557 |
| 2002/0063622 A1* | 5/2002 | Armstrong et al. | 340/10.31 |
| 2002/0123325 A1* | 9/2002 | Cooper | 455/411 |
| 2003/0065934 A1* | 4/2003 | Angelo et al. | 713/200 |

FOREIGN PATENT DOCUMENTS

| | | |
|---|---|---|
| EP | 1 083 622 A2 | 3/2001 |
| EP | WO 01 29574 A | 4/2001 |
| WO | 00/74406 A1 | 12/2000 |

* cited by examiner

WIRELESS COMMUNICATION DEVICE INTERCONNECTIVITY

RELATED APPLICATION

The present application claims priority to U.S. provisional patent application No. 60/331,963, entitled "Wireless Communication Device Interconnectivity," which was filed on Nov. 21, 2001.

FIELD OF THE INVENTION

The present invention relates to a wireless communication device having an antenna that is directly interconnected to a controller so that the controller has physical communication access to the wireless communication device. Further, the present invention relates to a wireless communication device connected to an antenna of a separate communication system wherein the wireless communication device and the separate communication system share a common antenna for receiving and/or transmitting information.

BACKGROUND OF THE INVENTION

Wireless communication devices, such as transponders, are commonly used to wirelessly communicate information about goods. For example, transponders may be attached to goods during their manufacture, transport and/or distribution to provide information, such as the good's identification number, expiration date, date of manufacture or "born on" date, lot number, and the like. The transponder may also be configured to receive and store security information concerning valuable goods, such as a portable computer. The transponder allows this information to be obtained unobtrusively using wireless communication with an interrogation reader without slowing down the manufacturing, transportation, and/or distribution process.

It may be desirable to provide a transponder or other wireless communication device that is also accessible for communications by a separate controller or other communication system using a direct interconnection. The controller may desire to retrieve information stored previously by an interrogation reader in the memory of the wireless communication device without having to employ wireless communication with the wireless communication device. The controller may also desire to use the wireless communication device as a "mailbox," or memory storage area. The information stored by the controller in the wireless communication device's memory can be later retrieved by the controller and/or an interrogation reader. In this manner, the controller has effective use of the wireless communication device as a separate memory storage area that can also be wirelessly accessed by a wireless communication system. There may be any number of applications where this functionality is advantageous.

A problem exists when coupling the wireless communication device to the controller to provide the "mailbox." Since a wireless communication device is usually provided in the form of an encapsulated integrated circuit (IC) chip, the only accessible interface to the wireless communication device is through the interface pins on the chip. Wireless communication devices typically do not contain an input or output port interface that allows communication through direct interfacing. Therefore, a need exists to find a method of directly interfacing a wireless communication device to a controller by other means, even if the wireless communication device was not intended to provide this functionality.

Further, some electronic objects or other controllers have their own wireless communication systems having an antenna separate from any wireless communication device that may be included with the controller. For example, consider a portable computer that has a Bluetooth transceiver. The Bluetooth transceiver is coupled to an antenna that is used by the portable computer for short-range wireless communication. However, the portable computer must be powered in order to provide power to the Bluetooth unit for wireless communication since Bluetooth transceivers are not passive devices, meaning that they require a power source to operate. It may be advantageous to provide a wireless communication device, such as a transponder, on the portable computer so that the portable computer may wirelessly communicate information without being powered. However, a cost effective method must be provided for doing so.

It may be desirable to store the identification of the portable computer in memory so that such information can be used during manufacturing and/or distribution for tracking. However, it may be necessary to communicate the identification information wirelessly even when the portable computer is not powered on. A wireless communication device coupled to the portable computer may be used to allow wireless communication of information concerning the portable computer even when the portable computer is not powered, since the wireless communication device can receive power from an incoming signal to provide power for communication.

Therefore, an object of the present invention is to provide techniques for interfacing an external controller or other device directly to a wireless communication device without interfacing with an input port on the wireless communication device, something most wireless communication devices do not provide. Further, another object of the present invention is to provide a cost effective manner to provide a wireless communication device on objects already having a separate communications system, so that information concerning the object can still be wirelessly communicated even if the object and separate wireless communication system are not powered and therefore not operational.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention relates to a wireless communication device that is interfaced directly to a separate device or controller to provide wired communication access from the controller to the wireless communication device.

The present application claims priority to U.S. provisional patent application No. 60/331,963, entitled "Wireless Communication Device Interconnectivity," which was filed on Nov. 21, 2001. U.S. provisional application No. 60/331,963 is incorporated herein by reference in its entirety.

The wireless communication device has an antenna for wireless communications, which is interconnected directly to the controller. In this way, the controller does not connect to an input interface or the internal components of the wireless communication device, and can emit a signal onto the antenna of the wireless communication device that simulates a wireless communication signal emitted by an interrogation reader. The wireless communication device will detect the incoming signal from the controller as if the signal was communicated wirelessly from an interrogation reader. The wireless communication device will respond as normal and as designed, thereby allowing the controller to interface directly with the wireless communication device for any purpose desired.

The present invention also relates to a wireless communication device that is attached or included in an electronic object, such as a portable computer, having its own separate communication system. The separate communication system has an antenna for receiving and transmitting wireless communications, and is powered by a power supply included in the object. Since the separate communication system can only communicate when powered, a separate passive wireless communication device is provided for wireless communication that does not require power from the power supply to communicate. The wireless communication device is interfaced with the existing antenna of the separate communication system so that the wireless communication device and separate communication system share a common antenna to reduce cost. The antenna may also be interconnected to a controller associated with the object so that the controller can directly communicate to the wireless communication device, as described above.

Before discussing the particular aspects, details, and applications of the interconnectivity of the wireless communication device according to the present invention as illustrated in FIGS. 2-10 of this application, a typical wireless communication system in the prior art that may be used with the present invention is discussed below.

Figure 1:
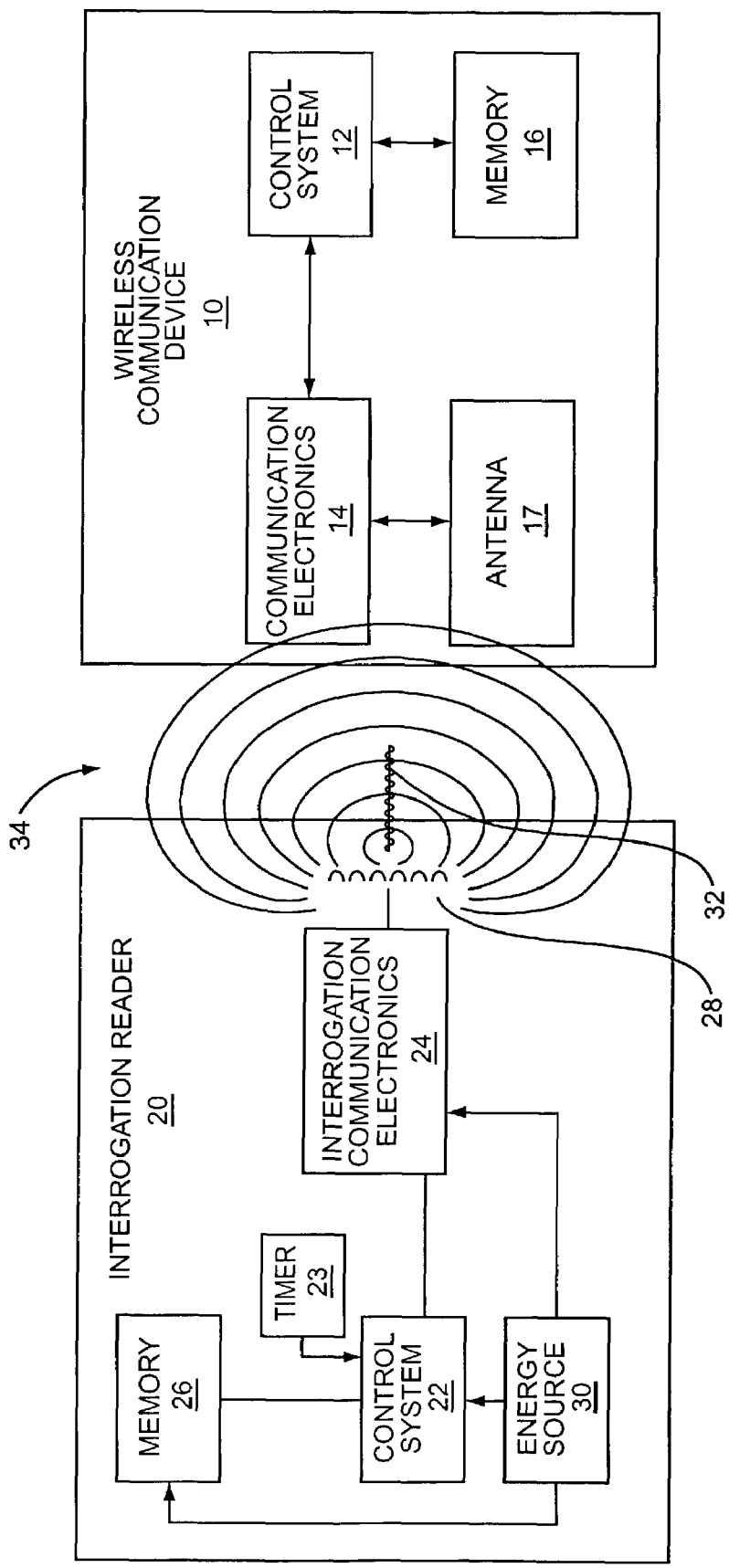
FIG. 1 is a schematic diagram of a typical interrogation reader and wireless communication device in the prior art.

FIG. 1 illustrates a wireless communication device and communication system that may be used with the present invention. The wireless communication device 10 is capable of communicating information wirelessly. The wireless communication device 10 may include a control system 12, communication electronics 14, and memory 16. The wireless communication device 10 may also be known as a "radio-frequency identification device" (RFID) or "transponder," and any of these preceding devices are interchangeably applicable to the present invention. The communication electronics 14 is coupled to an antenna 17 for wirelessly communicating information in radio-frequency signals. The communication electronics 14 is capable of receiving modulated radio-frequency signals through the antenna 17 and demodulating these signals into information passed to the control system 12. The wireless communication device 10 is typically an integrated circuit (IC) chip that is encapsulated and includes external interface pins. The antenna 17 may be any type of antenna, including but not limited to a pole or slot antenna. The antenna 17 may be internal or external with respect to the wireless communication device 10.

The control system 12 may be any type of circuitry or processor that receives and processes information received by the communication electronics 14, including a microcontroller or microprocessor. The wireless communication device 10 may also contain a memory 16 for storage of information. Such information may be any type of information about goods, objects, or articles of manufacture, including but not limited to identification, tracking, environmental information, such as pressure and temperature, and other pertinent information. The memory 16 may be electronic memory, such as random access memory (RAM), read-only memory (ROM), flash memory, or other type of non-volatile memory (NVM), or a diode, for example. The memory 16 may also be mechanical memory, such as a switch or dipswitch, for example.

Some wireless communication devices 10 are termed "active" devices in that they receive and transmit data using their own energy source coupled to the wireless communication device 10. A wireless communication device 10 may use a battery for power as described in U.S. Pat. No. 6,130,602 entitled "Radio frequency data communications device," or may use other forms of energy, such as a capacitor as described in U.S. Pat. No. 5,833,603, entitled "Implantable biosensing transponder." Both of the preceding patents are incorporated herein by reference in their entirety.

Other wireless communication devices 10 are termed "passive" devices meaning that they do not actively transmit and therefore may not include their own energy source for power. One type of passive wireless communication device 10 is known as a "transponder." A transponder effectively transmits information by reflecting back a received signal from an external communication device, such as an interrogation reader. An example of a transponder is disclosed in U.S. Pat. No. 5,347,280, entitled "Frequency diversity transponder arrangement," incorporated herein by reference in its entirety. Another example of a transponder is described in co-pending patent application Ser. No. 09/678,271, entitled "Wireless communication device and method," incorporated herein by reference in its entirety.

FIG. 1 depicts communication between a wireless communication device 10 and an interrogation reader 20. The interrogation reader 20 may include a control system 22, interrogation communication electronics 24, memory 2 6, and an interrogation antenna 28. The interrogation antenna 28 may be any type of antenna, including a pole antenna or a slot antenna. The interrogation reader 20 may also contain its own internal energy source 30, or may be powered through an external power source. The energy source 30 may include batteries, a capacitor, solar cell or other medium that contains energy. The energy source 30 may also be rechargeable. A timer 23 may also be coupled to the control system 22 for performing tasks that require timing operations.

The interrogation reader 20 communicates with the wireless communication device 10 by emitting an electronic signal 32 modulated by the interrogation communication electronics 24 through the interrogation antenna 28. The interrogation antenna 28 may be any type of antenna that can radiate a signal 32 through a field 34 so that a reception device, such as the wireless communication device 10, can receive the signal 32 through its own antenna 17. The field 34 may be electromagnetic, magnetic, or electric. The signal 32 may be a message containing information and/or a specific request for information from or task performance by the wireless communication device 10.

When the antenna 17 is in the presence of the field 34 emitted by the interrogation reader 20, the communication electronics 14 is energized by the energy in the signal 32, thereby energizing the wireless communication device 10. The wireless communication device 10 remains energized so long as its antenna 17 is in the field 34 of the interrogation reader 20. The incoming signal 32 is also amplitude modulated to carry information in the form of data to the wireless communication device 10. Data is communicated back from the wireless communication device 10 to the interrogation reader 20 by modifying the wireless communication device's input characteristics. The change in the wireless communication device's input characteristics, which may be achieved by shorting some form of a transistor (not shown) across the input of the wireless communication device 10, causes the incoming signal 32 to be reflectively modulated with response information and re-emitted to the interrogation reader 20. This technique of a wireless communication device 10 reflectively communicating a response back to an interrogation reader 20 is well known in the art.

It is readily understood to one of ordinary skill in the art that there are many other types of wireless communications devices and communication techniques than those described herein, and the present invention is not limited to a particular type of wireless communication device 10, technique or method.

Figure 2:
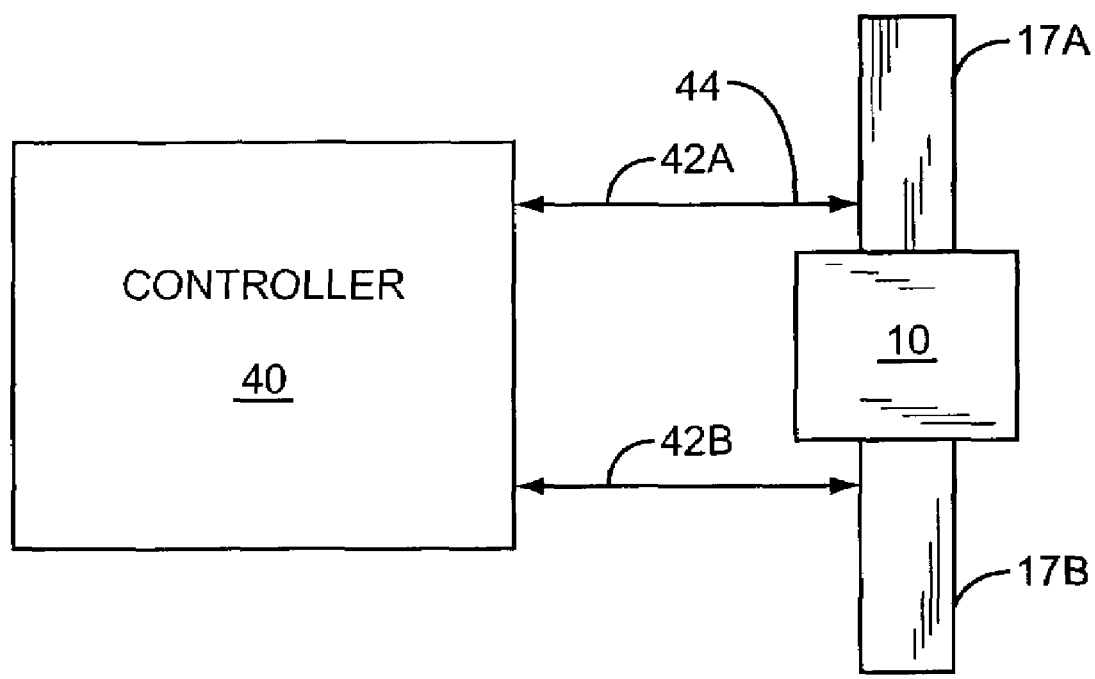
FIG. 2 is a schematic diagram of a wireless communication device and antenna interconnected to a controller.

FIG. 2 illustrates the wireless communication device 10 having an antenna 17 that is interconnected with a controller 40 using connection points 42A, 42B. Connection points 42A, 42B may be any type of conductive material that is capable of conductively connecting a controller 40 or other electronic device to the antenna 17. The term "interconnection" or "interconnectivity" is defined as a direct coupling or connection throughout this application. The wireless communication device 10 is capable of receiving wireless communications through a signal 32, using its antenna 17 as described above and illustrated in FIG. 1. In addition to being capable of receiving wireless communications, the wireless communication device 10 illustrated in FIG. 2 is capable of receiving communications via a direct interconnection with the controller 40 through connection points 42A, 42B. In this manner, the wireless communication device 10 can receive communications from two different sources: wirelessly from an interrogation reader 20 and directly from a controller 40 or other electronic device through an interconnection.

In the embodiment illustrated in FIG. 2, the wireless communication device 10 can receive communications other than through a signal 32 emitted by an interrogation reader 20. The wireless communication device 10 may be powered by a direct current (DC) voltage 44 applied through a direct interconnect between the controller 40 and the antenna 17A, 17B of the wireless communication device 10. The controller 40 switches the DC voltage 44 on and off at a rate that is substantially the same as the operating frequency of the wireless communication device 10 and antenna 17. In this manner, the DC signal 44 applied by the controller 40 onto the antenna 17 appears the same as a wireless signal 32 from the perspective of the wireless communication device 10. The controller 40 applies a signal 44 onto the antenna 17 that simulates a signal 32 from an interrogation reader 20 so that communication from the controller 40 is handled by the wireless communication device 10 just as if the communication was received by a signal 32 emitted from an interrogation reader 20. The controller 40 receives the response from the wireless communication device 10 by sensing the load on the power source.

In this configuration, the controller 40 is capable of communicating to the wireless communication device 10 just as an interrogation reader 20 would communicate to the wireless communication device 10. The controller 40 may also desire to store data to and/or retrieve data from the memory 16 of the wireless communication device 10. This is especially useful if the wireless communication device 10 is attached to an object wherein the wireless communication device 10 contains information about the object, such as identification information. The controller 40 may receive such information through the antenna 17 of the wireless communication device 10. For example, it may be desirable for the controller 40 and an interrogation reader 20 to exchange information, but the controller 40 may not include its own wireless communication system to communicate to the interrogation reader 20.

In the present invention, the interrogation reader 20 and controller 40 are capable of exchanging information via the wireless communication device 10. Since wireless communication device 10 and antenna 17 configurations are low cost and easy to manufacture, they are easily interconnected to a controller 40 or other devices to provide data exchange with an interrogation reader 20 is done in accordance with the present invention. Further, wireless communication devices 10 do not typically include input ports, thereby making it impossible, notwithstanding the present invention, to directly interface a controller 40 to the wireless communication device 10 for wired communications.

In the embodiment illustrated in FIG. 2, the wireless communication device 10 is also capable of acting as a wireless "mailbox" in that the controller 40 has access to the memory 16 in the wireless communication device 10 for use as a storage device. A "mailbox," in its broadest definition, is a storage device that is capable of storing information. The controller 40 need only be interconnected to the antenna 17 of the wireless communication device 10 and capable of communicating a signal 44 having a protocol compatible with the wireless communication device 10. Any information stored by the controller 40 in the memory 16 of the wireless communication device 10 may be accessed at a later time by the controller 40. Whether the controller 40 uses the wireless communication device 10 as a "mailbox,"

or as a communication exchange medium with an interrogation reader 20, the present invention may be used for any application or purpose where it is desirable for a wireless communication device 10 to be accessible by a controller 40 or other electronic device via a direct interconnection and not solely through wireless communications.

Figure 3:
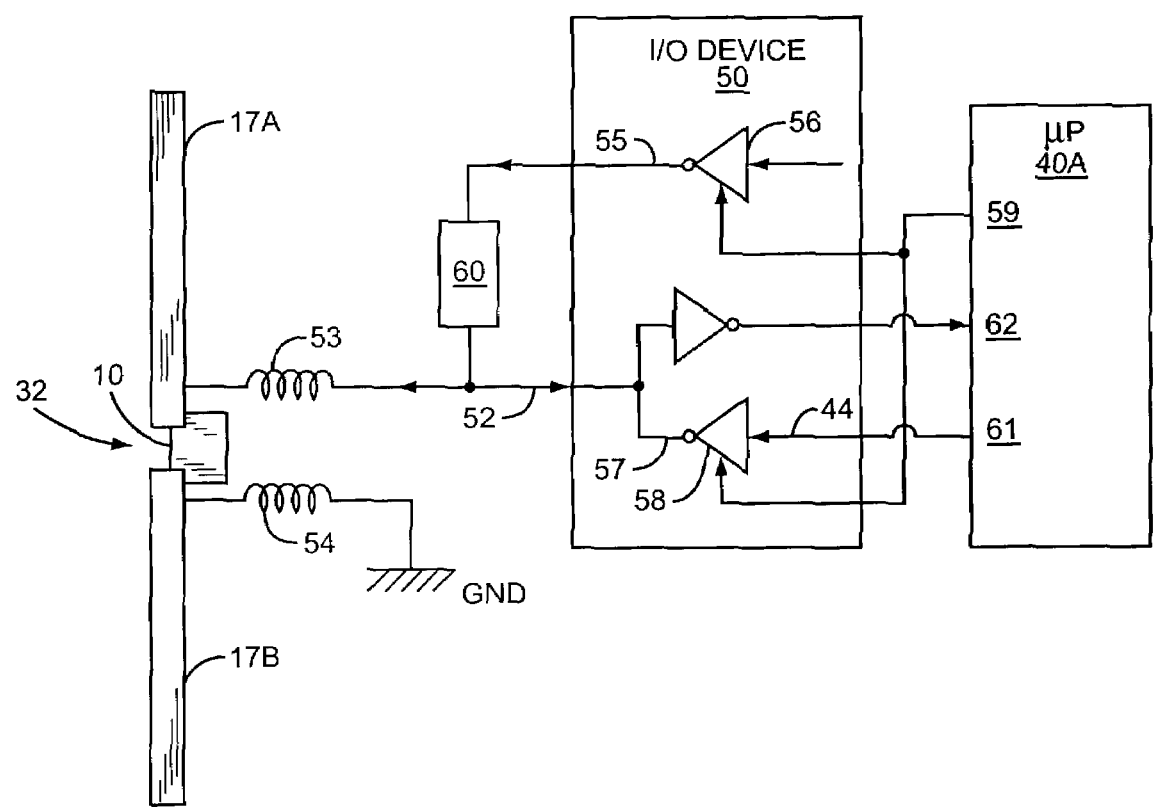
FIG. 3 is a schematic diagram of a UHF wireless communication device and antenna interconnected to a controller.

FIG. 3 illustrates one embodiment of the controller 40 and wireless communication device 10 illustrated in FIG. 2 wherein the wireless communication device 10 is an ultra-high frequency (UHF) RFID. The wireless communication device 10 is interconnected, via a connection to the antenna 17 of the wireless communication device 10, to any electronic device or controller 40. In FIG. 3, the controller 40 is provided in the form of a microprocessor 40A.

The wireless communication device 10 operates as designed and as normal when receiving wireless communications via a signal 32 through the antenna 17, as previously described and illustrated in FIG. 1. The microprocessor 40A is interconnected to the wireless communication device 10 through an input/output (I/O) device 50. The I/O device 50 is connected to the wireless communication device 10 through a switchable input/output (I/O) port 52 contained in the I/O device 50 that is connected to an inductor 53, which is connected to one pole of the antenna 17A. The switchable I/O port 52 is the communication conduit between the microprocessor 40A and the wireless communication device 10. The other pole of the antenna 17B is connected to another inductor 54 that is connected to ground. The inductors 53, 54 block the high-frequency signal 32 that is received by the antenna 17 from an interrogation reader 20, but allow DC or low frequency signals from the switchable I/O port 52 to pass through to the I/O device 50.

When the microprocessor 40A is powered down or is not emitting an output communications signal 44 to the antenna 17, the switchable I/O port 52 is configured as an input device. The microprocessor 40A controls the output 55 of a pull-up output device 56 and the output 57 of a second output device 58 in the I/O device 50 using a first output signal 59 that drives the second output device 58 and the pull-up output device 56 into a tri-state mode. The pull-up output device 56 drives a pull-up resistor 60 so that the microprocessor 40A does not load the rectified signal 32 from the wireless communication device 10 or otherwise interfere with normal operation of the wireless communication device 10.

When the microprocessor 40A is communicating to the wireless communication device 10, the switchable I/O port 52 is configured as an output. The microprocessor 40A outputs a signal 44 through a second output port 61 and the second output device 58 that is equivalent to the rectified output of the wireless communication device's rectifier when the wireless communication device 10 is illuminated with an amplitude modulated signal. The pull-up output device 56 is left in tri-state mode. This provides power to the wireless communication device 10 and allows the signal 44 to be sent to the wireless communication device 10. The microprocessor 40A then prepares to receive data from the wireless communication device 10 by making the pull-up output device 56 an output and setting it high, thereby making the switchable I/O port 52 an input. When the wireless communication device 10 modulates its input impedance by switching its input transistor (not shown) on and off, this modulation also pulls the input port 62 of the microprocessor 40A up and down, using the pull-up resistor 60 as a load.

Figure 4:
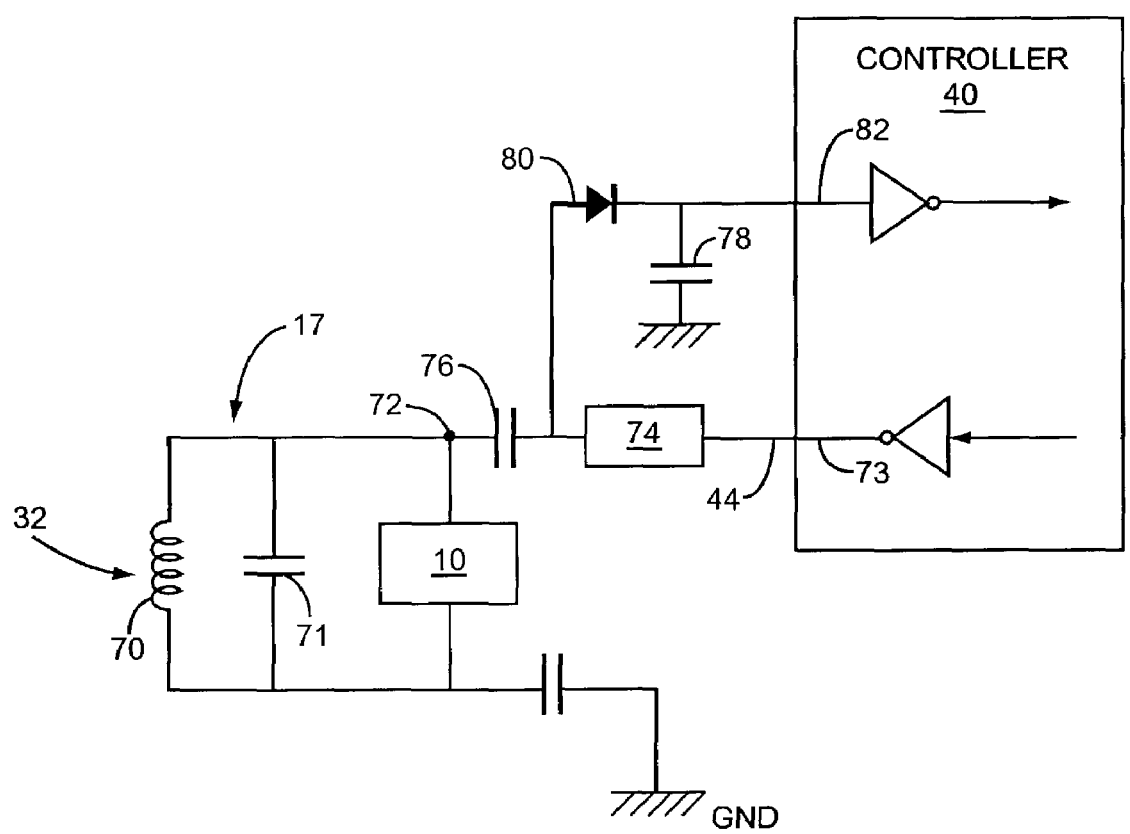
FIG. 4 is a schematic diagram of a low frequency (LF) wireless communication device interconnected to a controller.

FIG. 4 illustrates another embodiment of the controller 40 and wireless communication device 10 illustrated in FIG. 2, wherein the wireless communication device 10 is a low frequency (LF) RFID. For example, an LF wireless communication device 10 may operate at a frequency of 13.56 MHz. The wireless communication device 10 may be interconnected, via a connection through its antenna 17, to any electronic device or controller 40. This embodiment is different than the UHF wireless communication device 10 illustrated in FIG. 3 due to the way that the LF wireless communication device 10 is designed to operate.

A typical LF wireless communication device 10 has an antenna 17 that is an inductive coil of wire 70, resonated with a capacitor 71 in parallel with the inputs 72 of the wireless communication device 10 to form an LC antenna 17. An LF wireless communication device 10 tends to clock its control system 12 and other internal logic from the incoming LF signal 32. Therefore, a controller 40 that is interconnected with an LF wireless communication device 10 needs to assert a signal 44 onto the antenna 17 of the LF wireless communication device 10 that uses exactly the same protocol and frequency as a signal received from an interrogation reader 20. This is in contrast to the UHF wireless communication device 10 that would typically require the controller 40 to assert a signal 44 that is equivalent to the rectified signal 32.

The circuit that is used to interconnect the controller 40 to the wireless communication device 10 illustrated in FIG. 4 operates as follows. The controller 40 drives a frequency signal 44 amplitude modulated with data from an output port 73 when the controller 40 desires to communicate to the wireless communication device 10. The frequency signal 44 provides both power to the wireless communication device 10 and data to be communicated to the wireless communication device 10. The frequency signal 44 is coupled to a limiting resistor 74 and a DC isolating capacitor 76 to the LC antenna 17. This creates a signal across the LC antenna 17 that is identical to the signal 32 that the wireless communication device 10 would receive from an LF interrogation reader 20. Another DC isolating capacitor 78 is connected between ground and the other input 72 of the wireless communication device 10. When the wireless communication device 10 communicates back to the LF interrogation reader 20 by creating a short across the coil 70, a higher current will flow through the limiting resistor 74 and cause the voltage to drop at the limiting resistor 74. A diode rectifier 80, that is connected to the input 82 of the controller 40, detects the voltage at the limiting resistor 74 and thereby recovers any information or data that is sent by the wireless communication device 10.

Figure 5:
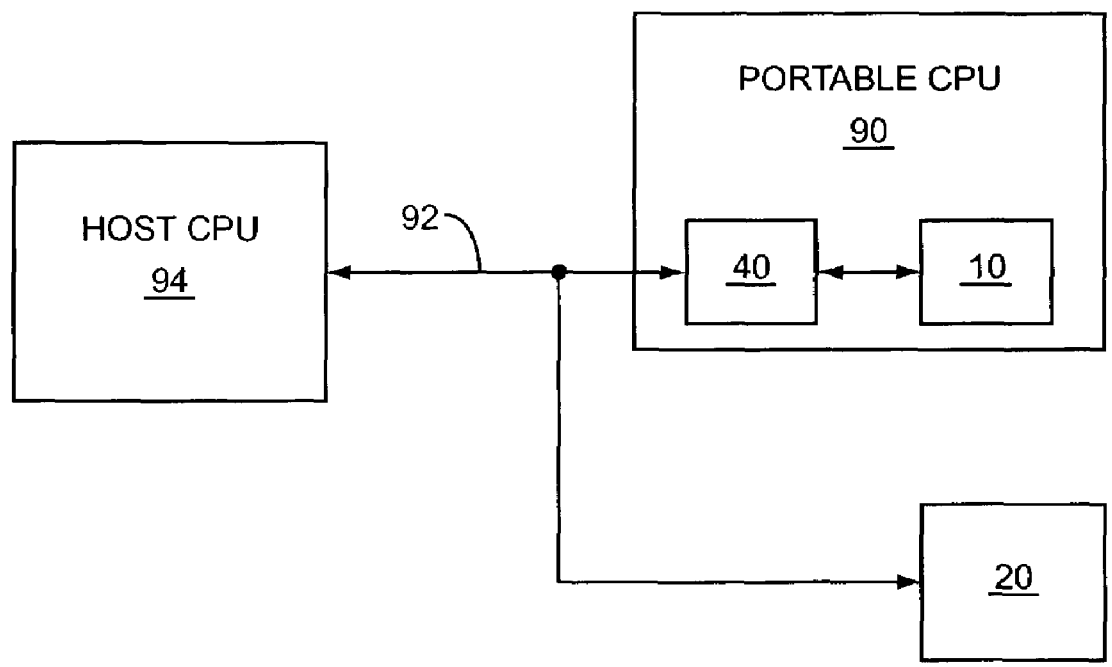
FIG. 5 is a schematic diagram of a security system for a portable computer employing a wireless communication device according to the present invention.

One novel application of the present invention, as shown in FIG. 5, is the use of the wireless communication device 10 and controller 40 configuration, illustrated in any of FIGS. 2-4, in a portable computer 90 for security purposes. A portable computer 90 may contain a wireless communication device 10 and controller 40, wherein the controller 40 is interconnected to the antenna 17 of the wireless communication device 10 as previously described. The portable computer 90 may be connected to a host computer 94 or other computer system through a network 92, whereby the portable computer 90 is capable of sending and receiving communications over the network 92 from the host computer 94, and to and from the controller 40 in the portable computer 90.

Figure 6:
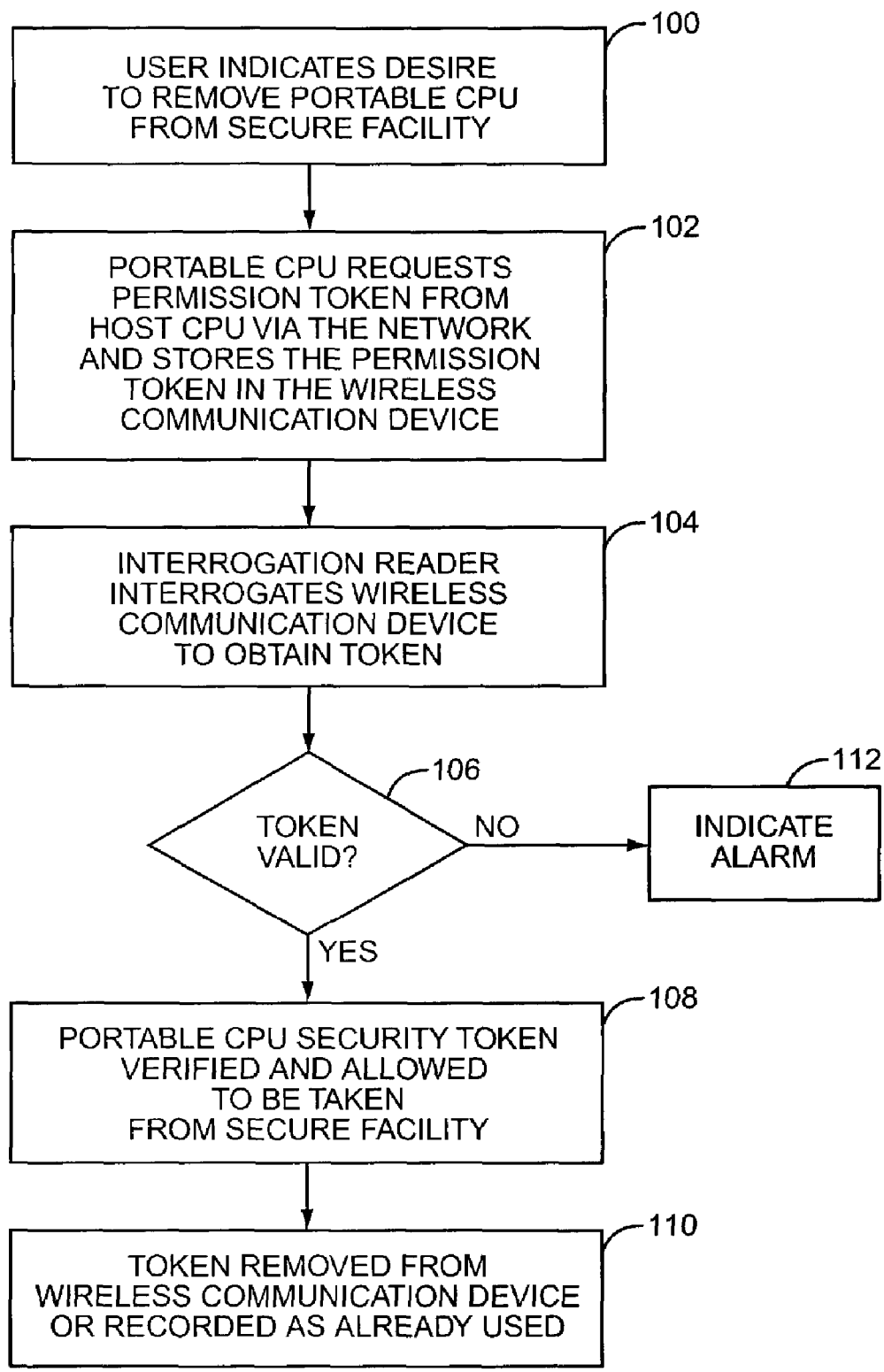
FIG. 6 is a flowchart diagram for the process of the security system illustrated in FIG. 5.

This security application is illustrated in the flowchart in FIG. 6. When the portable computer 90 is taken by its user when leaving a secure building or other facility, the user must indicate through an input to the portable computer 90 that the user desires to transport the portable computer 90

(block 100). To transport the portable computer 90, the portable computer 90 obtains a permission token from the network 92, which is then written into the memory 16 of the wireless communication device 10 by the controller 40 using the interconnection techniques described previously (block 102). The host computer 94 may only allow access to security tokens depending on the identification of the user.

Later, when the portable computer 90 is passed through a portal at the exit of the secure facility, the token stored in the wireless communication device 10 is interrogated by the interrogation reader 20 located at the portal (block 104). The interrogation reader 20 determines if the token is valid (decision 106). The interrogation reader 20 is also connected to the network 92 so that the interrogation reader 20 is capable of receiving the same token as stored by portable computer 90 in the wireless communication device 10 for comparison and validation purposes.

If the token is valid (decision 106), the portable computer 90 is allowed to be taken from the secure facility since the host computer system 94 is aware that the user previously obtained authorized permission to remove the portable computer 90 from the secure facility (block 108). The token may either be removed from the wireless communication device 10 by the interrogation reader 20 or recorded by the interrogation reader 20 as not being reusable in the future, so that the user must again obtain permission to remove the portable computer 90 the next time the portable computer 90 is transported (block 110). If the token is not valid (decision 106), the interrogation reader 20 can take any measures desired or designed, such sending a response signal and/or controlling a visual or audible alarm or message, to indicate that the portable computer 90 is not authorized to be removed from the secure facility (block 112).

Figure 7:
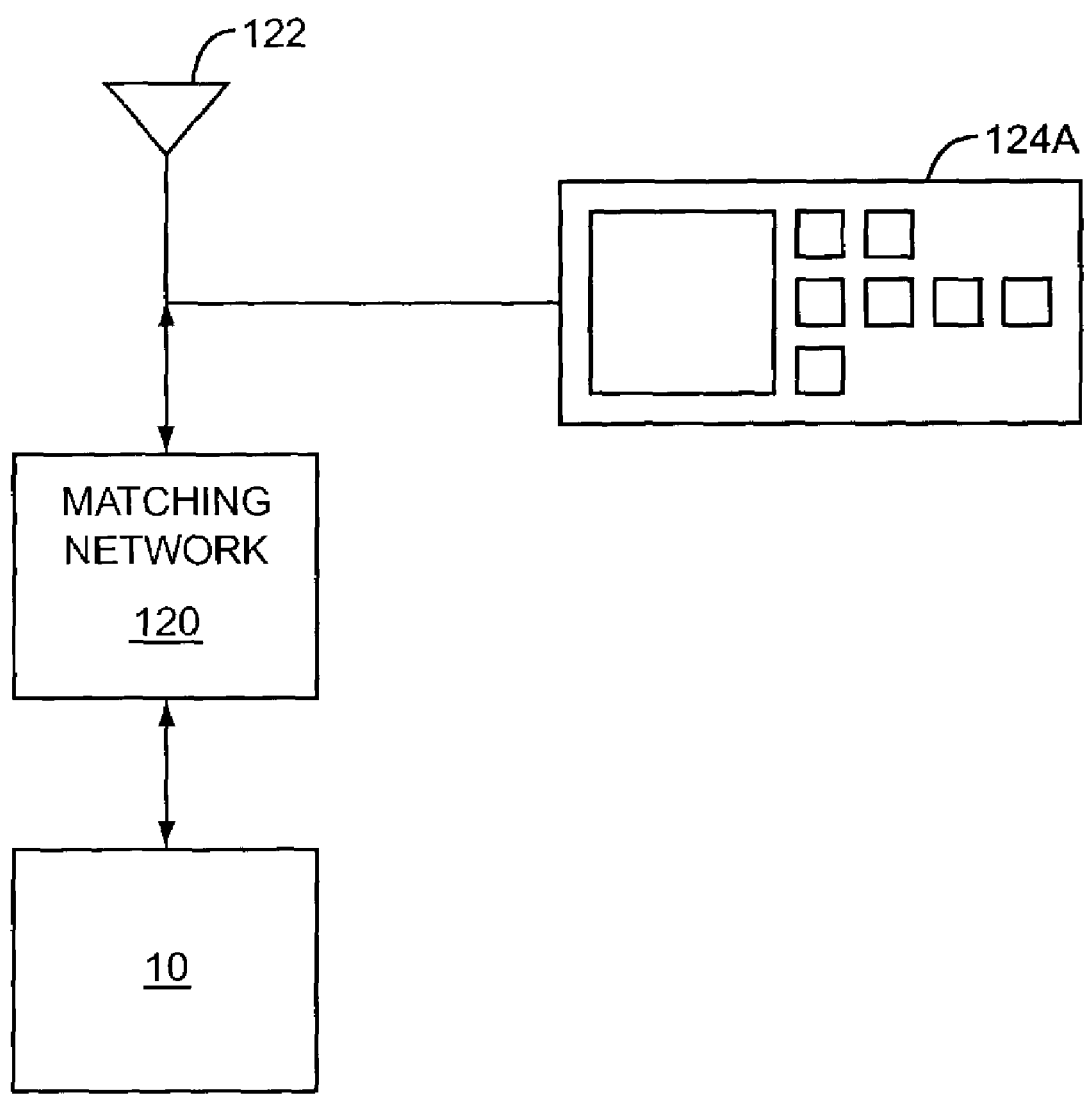
FIG. 7 is a schematic diagram of a wireless communication device interconnected to an antenna of a cellular or mobile phone, wherein the wireless communication device and the cellular phone share a common antenna and are designed to operate at different frequencies.

FIG. 7 illustrates another aspect of the present invention whereby a wireless communication device 10 not having its own antenna 17 is connected to an antenna 122 of a separate communication system. In this manner, the wireless communication device 10 is sharing the antenna 122 of the other communication system, thereby eliminating the need for the wireless communication device 10 to provide its own antenna 17. This aspect of the present invention may be used in conjunction with the interconnectivity of a controller 40 or other electronic device to the antenna 17 of a wireless communication device 10, as described above. In this embodiment, the operating frequency of the wireless communication device 10 is different from the operating frequency of the antenna 122 of the separate communication system.

The wireless communication device 10 is coupled to a matching network 120, which is in turn connected to the antenna 122 of a separate communication system 124. The separate communication system 124 may be a cellular or mobile phone 124A that is designed to communicate at 920 MHz, for example. The matching network 120 is provided to match the operating frequency of the wireless communication device 10 to the operating frequency of the antenna 122 and separate communication system 124. The matching network 120 can prevent a transmission from the separate communication system 124 from overloading the wireless communication device 10. The matching network 120 may also prevent the wireless communication device's non-linear components to cause radiation of unwanted harmonics.

For example, the wireless communication device 10 may be designed to be interrogated by an interrogation reader 20 at one band, say 869 MHz, and the cellular phone 124A may be designed to operate at a higher frequency, say 920 MHz. The matching network 120 may provide isolation between the cellular phone transmission to the antenna 122 and the wireless communication device 10. At 920 MHz, the cellular phone 124A is matched to its antenna 122, and the matching network 120 transforms the impedance of the wireless communication device 10 to a very high impedance so that its connection to the antenna 122 does not affect the electrical connection between the cellular phone 124A and the antenna 122. At 869 MHz, the matching network 120 transforms the wireless communication device 10 to an impedance that matches to the impedance of the antenna 122 ensuring efficient power transfer between the antenna 122 and the wireless communication device 10 for efficient operation. More information on impedance matching between a wireless communication device 10 and an antenna 122 is disclosed in pending patent application Ser. No. 09/678,271, entitled "Wireless communication device and method," incorporated herein by reference in its entirety.

Figure 8:
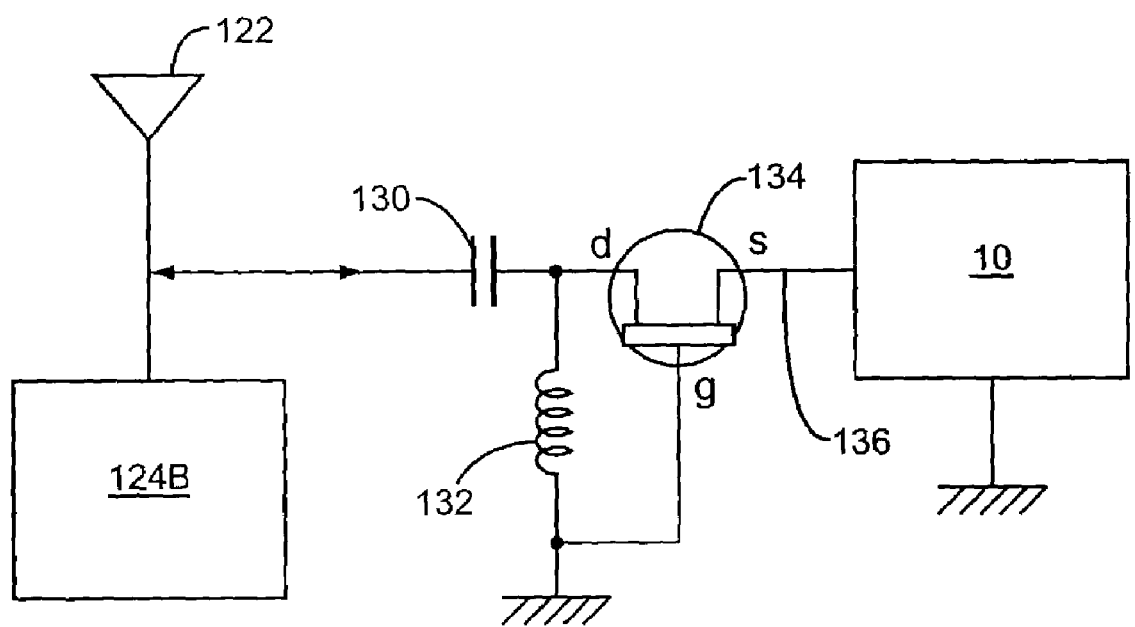
FIG. 8 is a schematic diagram of a wireless communication device interconnected to an antenna of a separate RF transceiver, wherein the wireless communication device and the RF transceiver share a common antenna are designed to operate at similar frequencies.

FIG. 8 illustrates another embodiment of the present invention whereby the wireless communication device 10 is connected to an antenna 122 of a separate communication system 124. However, in this example, the operating frequency of the wireless communication device 10 is similar to the operating frequency of the separate communication system 124. An RF transceiver 124B and wireless communication device 10 are coupled to the same antenna 122 and intended to operate inside substantially at the same frequency band. The wireless communication device 10 is coupled to the antenna 122 via a matching capacitor 130, an inductor 132, and a series of GaAs field emitting transistors (FETs) 134. The capacitor 130 and inductor 132 form an LC circuit, and the FETs 134 act as a switch.

When no radio-frequency power is present at the antenna 122 and the input 136 of the wireless communication device 10 is 0 Volts, the FET 134 has its gate and source at the same voltage, and presents a low resistance to the antenna 122. When the RF transceiver 124B transmits a signal, power is coupled into the wireless communication device 10 causing the voltage at the input 136 to rise, but also simultaneously reversing the bias at the gate of the FET 134 and reducing the coupling. Ideally, the attenuation provided by the FET 134 allows the voltage at the input 136 to rise to a point consistent with proper operation of the wireless communication device 10, but no higher, thereby limiting the voltage at the input 136.

Figure 9:
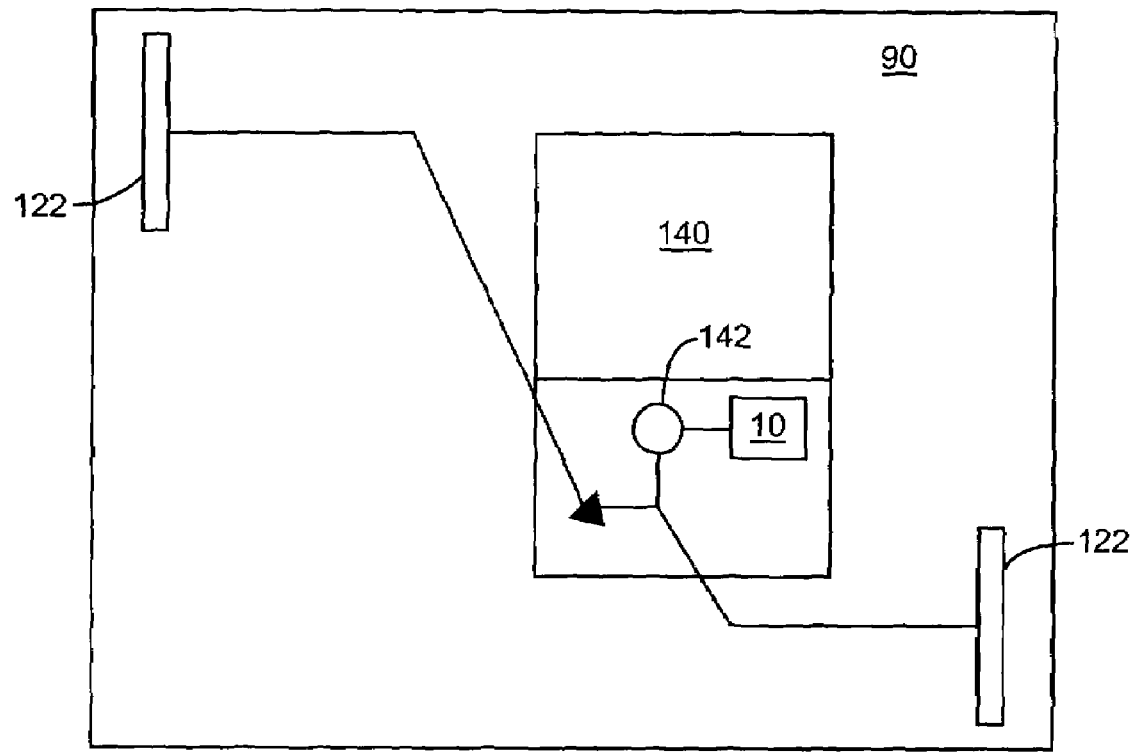
FIG. 9 is a schematic diagram of a wireless communication device included in a portable computer having a separate communication system, wherein the wireless communication device is interconnected to the antenna of the separate communication system when the portable computer is disconnected from a network connection or is powered off.

FIG. 9 illustrates a similar technique to that illustrated in FIG. 8 whereby a wireless communication device 10 is coupled to a distributed antenna 122 inside a portable computer 90. The portable computer 90 contains a wireless local area network (WLAN) or Bluetooth communication module 140 so that the portable computer 90 can be connected to a network 92 or other system for external wireless communications. The WLAN or Bluetooth module 140 inside the portable computer 90 is coupled to an antenna 122 for wireless communications. In this embodiment, the antenna 122 is provided as two poles on different sections of the portable computer 90. The wireless communication device 10 is also coupled to the antenna 122 at a common connection point 142. The portable computer 90 is adapted to provide a signal to open a normally closed switch (not shown), disconnecting the wireless communication device 10 from the common connection point 142 when the portable computer 90 is powered on and/or the WLAN module 140 is operable. When the portable computer 90 is not powered on and/or WLAN module 140 is not operational, the wireless communication device 10 is connected to the common connection point 142, via the normally closed switch, to connect the wireless communication device 10 to the antenna 122.

Note that the switching of the wireless communication device 10 to the common connection point 142 may be accomplished by other types of switches that may be automatic, controlled by sensing power from the WLAN module 140, or controlled by the portable computer 90. This embodiment may also be coupled with a data connection between the WLAN module 140 and the antenna 122, like that described previously and in FIGS. 2-4, to allow the wireless communication device 10 to act as a "mailbox" for the WLAN module 140.

Figure 10:
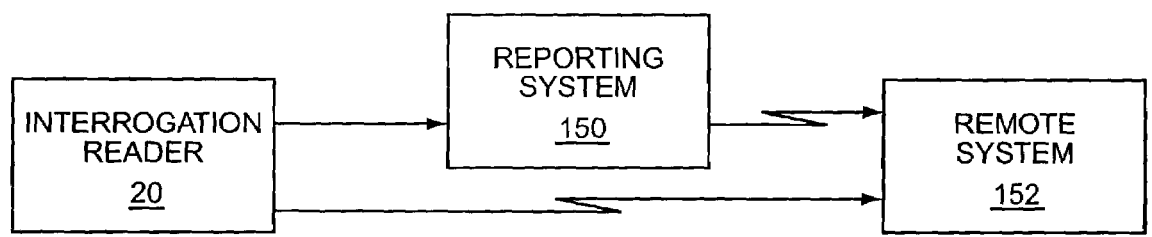
FIG. 10 is a schematic diagram of a reporting system that may be used in accordance with the present invention.

FIG. 10 illustrates one embodiment of a reporting system that may be provided for the interrogation reader 20. The interrogation reader 20 may be coupled to a reporting system 150. This reporting system 150 may be located in close proximity to the interrogation reader 20, and may be coupled to the interrogation reader 20 by either a wired or wireless connection. The reporting system 150 may be a user interface or other computer system that is capable of receiving and/or storing data communications received from the interrogation reader 20. This information may be any type of information received from a wireless communication device 10, including but not limited to identification information, a security token, tracking information, information stored in the memory 16 of the wireless communication device 10 by a controller, and/or other information concerning the wireless communication device 10. The information may be used for any purpose. For example, the identification information of a portable computer 90 having a wireless communication device 10 may be communicated to the reporting system 150 which may then be used for tracking, quality control, and supply-chain management for example. If the information received by the reporting system 150 is not normal or proper, the reporting system 150 may control the manufacturing operations to stop and/or change processes during manufacture and/or alert personnel in charge of the manufacturing process.

The reporting system 150 may also communicate information received from the wireless communication device 10, via the interrogation reader 20, to a remote system 152 and/or the interrogation reader 20. The communication between the reporting system 150 and the remote system 152 may be through wired communication, wireless communication, modem communication or other networking communication, such as the Internet. Alternatively, the interrogation reader 20 may communicate the information received from the wireless communication device 10 directly to the remote system 152 rather than first reporting the information through the reporting system 150 using the same or similar communication mediums as may be used between the reporting system 150 and the remote system 152.

The embodiments set forth above represent the necessary information to enable those skilled in the art to practice the invention and illustrate the best mode of practicing the invention. Upon reading the preceding description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

It should be understood that the present invention is not limited to applications disclosed in the patent application. It should also be understood that the present invention is not limited to any particular type of component, including but not limited to the wireless communication device 10 and its components, the interrogation reader 20 and its components, the controller 40, a portable CPU 90, a host computer 94, the matching network 120, the separate communication system 124, including a mobile or cellular phone 124A or RF transceiver 124B, reporting system 150, and remote system 152. The present invention can be used with any object including toys, calculators, watches, automobiles and their components, tires, etc. For the purposes of this application, couple, coupled, or coupling is defined as either a direct connection or a reactive coupling. Reactive coupling is defined as either capacitive or inductive coupling.

Those skilled in the art will recognize improvements and modifications to the preferred embodiments of the present invention. All such improvements and modifications are considered within the scope of the concepts disclosed herein.

We claim:

1. A device, comprising:
   a wireless communication device having an antenna for wireless communications, wherein said antenna is adapted to receive a first communication signal having a defined protocol at a defined operating frequency for processing by said wireless communication device; and
   a controller that is interconnected to said antenna using at least one connection point on said antenna;
   wherein said controller is adapted to send a second communication signal emulating said defined protocol at said defined operating frequency of said first communication signal over said at least one connection point to said antenna, and wherein said wireless communication device is adapted to receive said second communication signal from said controller through said antenna for processing while continuing to be configured to receive said first communication signal through said antenna.

2. The device of claim 1, wherein said wireless communication device is adapted to receive energy for operation from said first and second communication signals.

3. The device of claim 1, wherein said wireless communication device contains memory, and wherein said wireless communication device is adapted to store information received from said first and second communication signals in said memory.

4. The device of claim 3, wherein said wireless communication device is configured to be interrogated by an interrogation reader.

5. The device of claim 4, wherein said wireless communication device is configured to communicate information in said memory to said interrogation reader in response to interrogation by said interrogation reader.

6. The device of claim 1, wherein said controller is coupled to said antenna of said wireless communication device through an input/output port.

7. The device of claim 6, wherein said input/output port is switchable to allow said second communication signal to be sent from said controller to said wireless communication device and to allow a third communication signal to be sent from said wireless communication device to said controller.

8. The device of claim 7, wherein said controller is configured to control output of a pull-up device to place said input/output port in a tn-state mode.

9. The device of claim 1, wherein said wireless communication device is a low frequency device.

10. The device of claim 9, wherein said controller is configured to drive said second communication signal which is amplitude modulated and coupled to said antenna using a limiting resistor and a direct current isolating capacitor.

11. The device of claim 1, wherein said wireless communication device is contained inside a portable computer.

12. A method of communicating with a wireless communication device configured to receive a first communication signal wirelessly through an antenna, comprising:
receiving a second communication signal through said antenna while continuing to be configured to receive said first communication signal wirelessly through said antenna, wherein said second communication signal is generated by a controller interconnected to said antenna using at least one connection point on said antenna; and
processing said second communication signal in the wireless communication device, wherein said wireless communication device is communicatively coupled to said antenna.

13. The method of claim 12, further comprising powering said wireless communication device using said second communication signal.

14. The method of claim 12, further comprising storing information received from said second communication signal in memory coupled to said wireless communication device.

15. The method of claim 14, further comprising interrogating said wireless communication device using an interrogation reader.

16. The method of claim 15, further comprising communicating information in said memory to said interrogation reader in response to interrogation by said interrogation reader.

17. The method of claim 12, further comprising switching an input/output port to allow said second communication signal to be sent from said controller to said wireless communication device and to allow a third communication signal to be sent from said wireless communication device to said controller.

18. The method of claim 17, further comprising driving said second communication signal that is amplitude modulated and coupled to said antenna using a limiting resistor and a direct current isolating capacitor.

19. The device of claim 1, wherein said second communication signal is generated by said controller switching on and off a voltage applied to said antenna of said wireless communication device at a rate that is substantially the same as said operating frequency of said first communication signal.

20. The method of claim 12, wherein said second communication signal is generated by said controller switching on and off a voltage applied to said antenna of said wireless communication device at a rate that is substantially the same as an operating frequency of said first communication signal.

21. A system, comprising:
a wireless communication device having an antenna configured to receive a first wireless communication signal; and
an electronic circuit that is separate from said wireless communication device, wherein said electronic circuit is connected to said antenna of said wireless communication device using at least one physical connection point on said antenna, and wherein said electronic circuit is configured to communicate with said wireless communication device by communicating a second signal via said physical connection point on said antenna while said wireless communication device remains configured to receive said first wireless communication signal via said antenna, said second signal being configured to emulate said first wireless communication signal.

22. The system of claim 21, wherein said second signal communicated by said electronic circuit is configured to emulate a defined protocol of said first wireless communication signal.

23. The system of claim 21, wherein said second signal communicated by said electronic circuit is configured to emulate a defined operating frequency of said first wireless communication signal.

24. The system of claim 21, wherein said electronic circuit is a controller.

25. The system of claim 21, wherein said antenna is configured to receive said first wireless communication signal at a first operating frequency, said system further comprising a matching network coupled between said antenna and said wireless communication device, wherein said matching network is configured to match an impedance of said wireless communication device to an impedance of said antenna at a second operating frequency that is different than said first operating frequency, and wherein said electronic circuit is configured to communicate said second signal at said second operating frequency to said wireless communication device via said antenna and said matching network while said wireless communication device continues to be configured to receive said first wireless communication signal at said first operating frequency via said antenna.

26. The system of claim 21, wherein said wireless communication device is configured to receive information in said second signal communicated by said electronic circuit via said physical connection point on said antenna.

27. The system of claim 26, wherein said wireless communication device is further configured to transmit a wireless communication signal via said antenna, said transmitted wireless communication signal includes including information received from said electronic circuit.

28. The system of claim 21, wherein said electronic circuit further comprises a memory and is configured to receive a signal bearing information from said wireless communication device via said physical connection point on said antenna, said electronic circuit being further configured to store said information in said memory.

29. The system of claim 28, wherein said electronic circuit is further configured to retrieve information from said memory and communicate a signal bearing said information to said wireless communication device via said physical connection point on said antenna.

30. The system of claim 21, wherein said electronic circuit is communicatively coupled to a computing device separate from said wireless communication device, wherein said electronic circuit is configured to receive information from said computing device, and wherein said electronic circuit is configured to communicate a signal bearing said information to said wireless communication device via said physical connection point to enable said wireless communication device to communicate a wireless signal bearing said information via said antenna.

31. The system of claim 30, wherein said wireless communication device is configured to communicate said wireless signal bearing said information in response to an interrogation signal received wirelessly via said antenna.

* * * * *

UNITED STATES PATENT AND TRADEMARK OFFICE
CERTIFICATE OF CORRECTION

PATENT NO. : 7,366,466 B2
APPLICATION NO. : 10/301483
DATED : April 29, 2008
INVENTOR(S) : I. J. Forster et al.

It is certified that error appears in the above-identified patent and that said Letters Patent is hereby corrected as shown below:

| COLUMN | LINE | ERROR |
| --- | --- | --- |
| 9 | 53 | "920" should read --920-- |
| 12 (Claim 8, | 63 line 3) | "tn-state" should read --tri-state-- |
| 14 (Claim 27, | 38 line 4) | "includes including" should read --including-- |

Signed and Sealed this

Twenty-third Day of June, 2009

JOHN DOLL
*Acting Director of the United States Patent and Trademark Office*